US011970377B2

(12) United States Patent
Yu et al.

(10) Patent No.: US 11,970,377 B2
(45) Date of Patent: Apr. 30, 2024

(54) BRAKE DEVICE AND WINCH HAVING SAME

(71) Applicant: T-MAX (HANGZHOU) TECHNOLOGY CO., LTD., Zhejiang (CN)

(72) Inventors: Hangfei Yu, Zhejiang (CN); Shipei Yao, Zhejiang (CN); Senbiao Ge, Zhejiang (CN); Haojia Chen, Zhejiang (CN); Haibin Chen, Zhejiang (CN); Xuebo Hu, Zhejiang (CN)

(73) Assignee: T-MAX (HANGZHOU) TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 17/894,480

(22) Filed: Aug. 24, 2022

(65) Prior Publication Data

US 2023/0322533 A1 Oct. 12, 2023

(51) Int. Cl.
*B66D 5/06* (2006.01)

(52) U.S. Cl.
CPC .................................... *B66D 5/06* (2013.01)

(58) Field of Classification Search
CPC ... B66D 5/06; B66D 5/20; B66D 1/08; B66D 1/10
See application file for complete search history.

(56) References Cited

U.S. PATENT DOCUMENTS 4,651,854 A * 3/1987 Harada ................. F16D 41/206 192/223.4
2003/0150674 A1* 8/2003 Daigre ..................... B66D 5/14 188/71.5
2014/0027232 A1* 1/2014 Lin .......................... B66D 5/06 192/15
2017/0015536 A1* 1/2017 Irie .......................... B66D 5/28
2023/0322533 A1* 10/2023 Yu ............................ B66D 5/06 254/375
2023/0322534 A1* 10/2023 Yu ............................ B66D 5/06 254/362

FOREIGN PATENT DOCUMENTS

CN 108059102 A * 5/2018

* cited by examiner

*Primary Examiner* — Sang K Kim
*Assistant Examiner* — Nathaniel L Adams
(74) *Attorney, Agent, or Firm* — Bridgeway IP Law Group, PLLC; Jihun Kim

(57) ABSTRACT

A brake device and a winch having the same are provided. The brake device includes a brake sleeve, a torsion spring, a sealing member and a braking assembly. The torsion spring is fitted over the braking assembly, and the brake sleeve is fitted over the torsion spring. The braking assembly is configured to drive the torsion spring to move between an expanded position and a retracted position, so as to lock and release the brake sleeve. The sealing member is arranged between the brake sleeve and the braking assembly, so that a sealing cavity is defined between the brake sleeve and the braking assembly.

14 Claims, 2 Drawing Sheets

BRAKE DEVICE AND WINCH HAVING SAME

CROSS-REFERENCE TO RELATED APPLICATION

This application is based on and claims priority to the Chinese Patent Application No. 202220829269.0 filed on Apr. 11, 2022, the entire contents of which are incorporated herein by reference.

FIELD

The present disclosure relates to a technical field of winches, and more particularly, to a brake device and a winch having the same.

BACKGROUND

In a control system of a winch, a brake part is a very important component. In order to ensure the safe operation of the winch during the process of removing obstacles, mounting facilities and dragging objects, it is necessary to accurately control the brake of the winch, so as to improve the safety and stability of the winch in use. However, the sealing effect of a brake device of the winch in the related art is poor, and the lubricating grease in the brake device tends to be thrown out, so that the noise tends to be generated due to the friction between a brake sleeve and a torsion spring, which reduces the reliability of the brake device in use.

SUMMARY

Embodiments of a first aspect of the present disclosure provide a brake device. The brake device includes a brake sleeve, a torsion spring, a sealing member and a braking assembly. The torsion spring is fitted over the braking assembly, and the brake sleeve is fitted over the torsion spring. The braking assembly is configured to drive the torsion spring to move between an expanded position and a retracted position, so as to lock and release the brake sleeve. The sealing member is arranged between the brake sleeve and the braking assembly, so that a sealing cavity is defined between the brake sleeve and the braking assembly.

Embodiments of a second aspect of the present disclosure provide a winch. The winch includes a rope drum and a brake device. The rope drum is configured to wind a traction rope on an outer periphery of the rope drum, and the brake sleeve is arranged in the rope drum. The brake device includes a brake sleeve, a torsion spring, a sealing member and a braking assembly. The torsion spring is fitted over the braking assembly, and the brake sleeve is fitted over the torsion spring. The braking assembly is configured to drive the torsion spring to move between an expanded position and a retracted position, so as to lock and release the brake sleeve. The sealing member is arranged between the brake sleeve and the braking assembly, so that a sealing cavity is defined between the brake sleeve and the braking assembly.

DETAILED DESCRIPTION

Embodiments of the present disclosure are described in detail below, and examples of the embodiments are shown in accompanying drawings. The following embodiments described with reference to the accompanying drawings are exemplary and are intended to explain the present disclosure and cannot be understood as limitations on the present disclosure.

A brake device 1 and a winch having the same according to the embodiments of the present disclosure are described below with reference to FIGS. 1 to 3.

Figure 1:
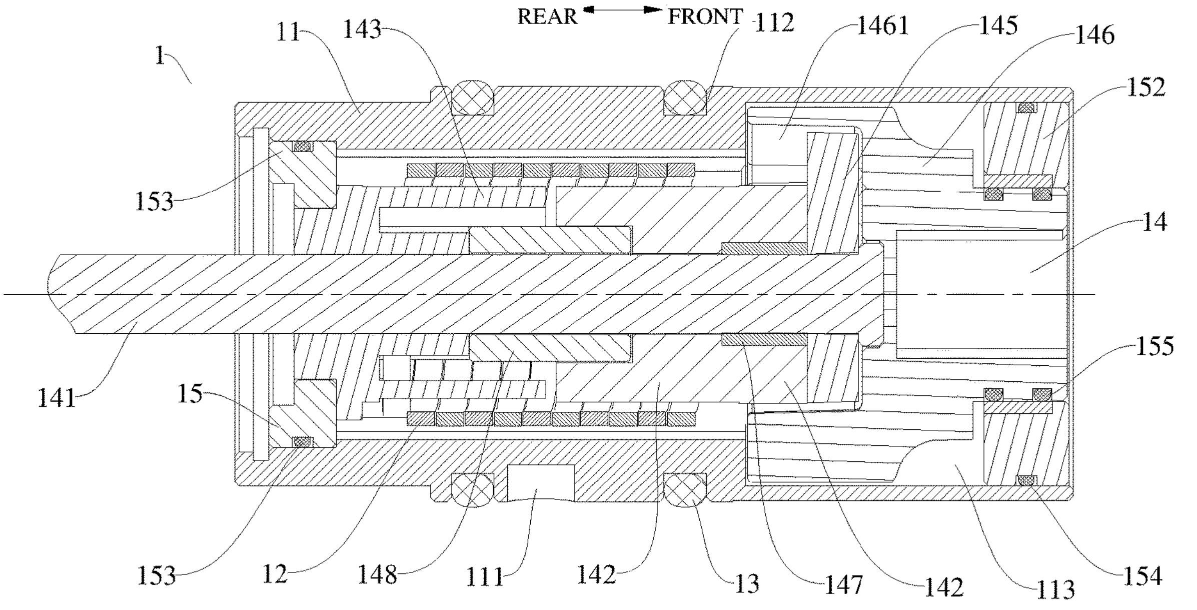
FIG. 1 is a partial sectional view of a winch according to an embodiment of the present disclosure.
Figure 2:
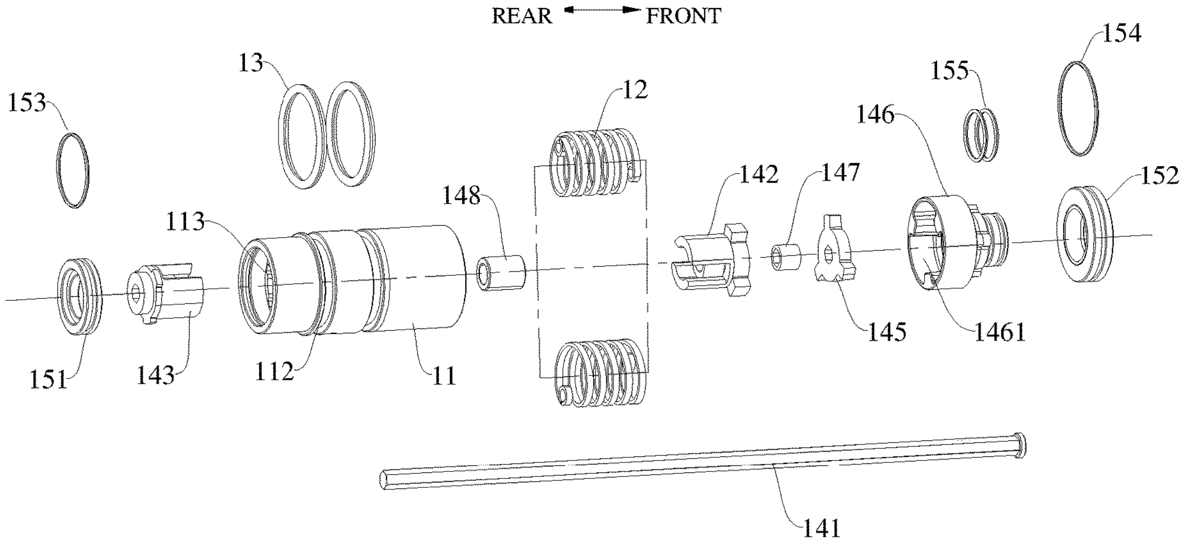
FIG. 2 is an exploded view of a brake device according to an embodiment of the present disclosure.
Figure 3:
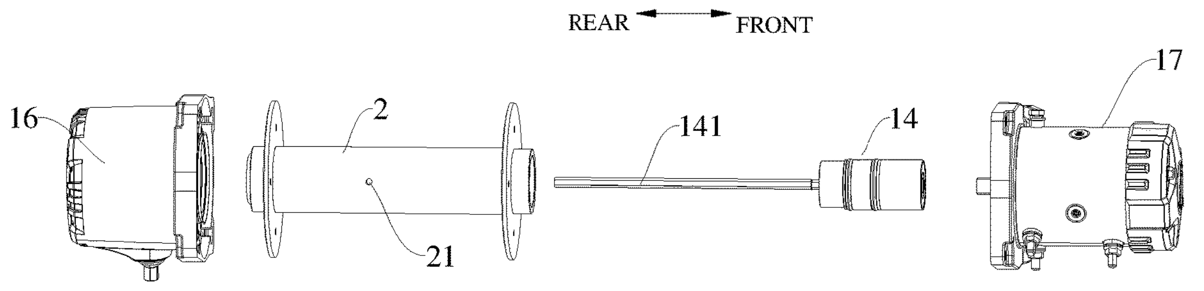
FIG. 3 is an exploded view of a winch according to an embodiment of the present disclosure.

As shown in FIGS. 1 to 3, the brake device 1 according to the embodiments of the present disclosure includes a brake sleeve 11, a torsion spring 12, a sealing member 15 and a braking assembly 14. The torsion spring 12 is fitted over the braking assembly 14, and the brake sleeve 11 is fitted over the torsion spring 12. The braking assembly 14 is configured to drive the torsion spring 12 to move between a expanded position and a retracted position, so as to lock and release the brake sleeve 11. The sealing member 15 is arranged between the brake sleeve 11 and the braking assembly 14, so that a sealing cavity 113 is defined between the brake sleeve 11 and the braking assembly 14.

It can be understood that the brake sleeve 11 is arranged in a rope drum 2. When the winch pulls a rope, the rope drum 2 may drive the brake sleeve 11 to rotate in a same direction. At this time, the torsion spring 12 is in the retracted position, a gap is defined between an inner wall of the brake sleeve 11 and the torsion spring 12, and the gap is filled with lubricating grease, so as to reduce the noise caused by the friction between the brake sleeve 11 and the torsion spring 12.

In the brake device 1 according to the embodiments of the present disclosure, the sealing member 15 is arranged between the brake sleeve 11 and the braking assembly 14, and the sealing cavity 113 is defined between the brake sleeve 11 and the braking assembly 14, so that the lubricating grease between the brake sleeve 11 and the torsion spring 12 can be prevented from being thrown out of the sealing cavity 113, and hence the lubrication of the lubricating grease between the brake sleeve 11 and the torsion spring 12 can be maintained for a long time, thus reducing the generation of noise, and achieving a great sealing effect of the brake device 1.

In some embodiments, as shown in FIGS. 1 and 2, the sealing member 15 includes a first sealing sleeve 151 and a second sealing sleeve 152. The first sealing sleeve 151 and the second sealing sleeve 152 are fitted over the braking assembly 14, and an outer peripheral wall of the first sealing sleeve 151 and an outer peripheral wall of the second sealing sleeve 152 abut with the inner wall of the brake sleeve 11. The sealing cavity 113 is defined between the first sealing sleeve 151, the second sealing sleeve 152, the inner wall of the brake sleeve 11 and an outer wall of the braking assembly 14.

It can be understood that, as shown in FIGS. 1 and 2, the first sealing sleeve 151 is arranged at one end of the brake sleeve 11 in an axial direction of the brake sleeve 11, and the second sealing sleeve 152 is arranged at the other end of the brake sleeve 11 in the axial direction of the brake sleeve 11. An inner wall of the first sealing sleeve 151 abuts with the braking assembly 14, the outer peripheral wall of the first sealing sleeve 151 abuts with the brake sleeve 11, and the first sealing sleeve 151 may rotate relative to the brake sleeve 11. An inner wall of the second sealing sleeve 152 abuts with the braking assembly 14, the outer peripheral wall of the second sealing sleeve 152 abuts with the brake sleeve 11, and the second sealing sleeve 152 may rotate relative to the brake sleeve 11. In the brake device 1 according to the embodiments of the present disclosure, the sealing member 15 is configured as the above structure, so that the brake device 1 has a great sealing effect, a simple structure, a reasonable design and a convenient assembling.

In some embodiments, as shown in FIGS. 1 and 2, the sealing member 15 further includes a first sealing ring 153 fitted over the first sealing sleeve 151. An inner wall of the first sealing ring 153 abuts with the outer peripheral wall of the first sealing sleeve 151, and an outer wall of the first sealing ring 153 abuts with the inner wall of the brake sleeve 11. It can be understood that the first sealing ring 153 is arranged between the first sealing sleeve 151 and the brake sleeve 11, thus further improving the sealing effect of the brake device 1 and reducing the leakage of the lubricating grease.

In some embodiments, as shown in FIGS. 1 and 2, the sealing member 15 further includes a second sealing ring 154 fitted over the second sealing sleeve 152. An inner wall of the second sealing ring 154 abuts with the outer peripheral wall of the second sealing sleeve 152, and an outer wall of the second sealing ring 154 abuts with the inner wall of the brake sleeve 11. It can be understood that the second sealing ring 154 is arranged between the second sealing sleeve 152 and the brake sleeve 11, thus further improving the sealing effect of the brake device 1 and reducing the leakage of the lubricating grease.

In some embodiments, as shown in FIGS. 1 and 2, the sealing member 15 further includes a third sealing ring 155 fitted over the braking assembly 14. An inner wall of the third sealing ring 155 abuts with the braking assembly 14, and an outer wall of the third sealing ring 155 abuts with the inner wall of the second sealing sleeve 152. It can be understood that the third sealing ring 155 is arranged between the second sealing sleeve 152 and the braking assembly 14, thus further improving the sealing effect of the brake device 1 and reducing the leakage of the lubricating grease.

In some embodiments, as shown in FIGS. 1-3, the braking assembly 14 includes a drive motor 16, a coupling 146, a connecting rod 141, a front pawl 142 and a rear pawl 143. The drive motor 16 is connected to the connecting rod 141 through the coupling 146. The front pawl 142 and the rear pawl 143 are coaxially arranged on the connecting rod 141, and the torsion spring 12 is arranged around the front pawl 142 and the rear pawl 143, i.e. the torsion spring 12 is fitted over the front pawl 142 and the rear pawl 143. The first sealing sleeve 151 is arranged between the rear pawl 143 and the brake sleeve 11, the second sealing sleeve 152 is arranged between the coupling 146 and the brake sleeve 11, and the third sealing ring 155 is arranged between the second sealing sleeve 152 and the coupling 146. The drive motor 16 is configured to drive the front pawl 142 and the rear pawl 143 to rotate through the connecting rod 141, so that the torsion spring 12 moves between the expanded position and the retracted position. It can be understood that the front pawl 142 and the rear pawl 143 are coaxially arranged relative to each other, a front end of the torsion spring 12 is fitted over the front pawl 142, and a rear end of the torsion spring 12 is fitted over the rear pawl 143. In some embodiments, the front pawl 142 and the rear pawl 143 may be spaced apart from each along the axial direction of the brake sleeve 11.

It can be understood that when the winch implements a traction operation, the drive motor 16 drives the front pawl 142 to rotate counterclockwise, the front pawl 142 drives the rear pawl 143 to rotate, and then the front pawl 142 and the rear pawl 143 drive the torsion spring 12 to rotate counterclockwise (a portion of the torsion spring 12 close to the rear pawl 143 changes slowly, for example, in speed, while a portion of the torsion spring 12 close to the front pawl 142 changes quickly, for example, in speed). At this time, a force applied to the torsion spring 12 for counterclockwise rotation overcomes an initial friction between the torsion spring 12 and the brake sleeve 11, and the torsion spring 12 is still retracted, so that it will not lead to a brake effect together with the brake sleeve 11, thus achieving the traction operation. When the drive motor 16 suddenly stops rotating during the traction operation, the torsion spring 12 is subjected to a reverse force as the rear pawl 143 is under the action of the gravity of the driven object. At this time, the reverse force overcomes the initial friction between the torsion spring 12 and the brake sleeve 11 (the portion of the torsion spring 12 close to the rear pawl 143 changes quickly, for example, in speed, while the portion of the torsion spring 12 close to the front pawl 142 changes slowly, for example, in speed, under the influence of the initial friction), and the torsion spring 12 is expanded, so that the brake effect is realized.

In some embodiments, as shown in FIGS. 1 and 2, the braking assembly 14 further includes a shift fork 145 fitted over the connecting rod 141. A profiled groove 1461 is arranged in one end of the coupling 146, the shift fork 145 is mounted in the profiled groove 1461, and the other end of the coupling 146 is connected to the drive motor 16. The drive motor 16 is configured to drive the coupling 146 to rotate, so that the shift fork 145 drives the connecting rod 141 to rotate. For example, the shift fork 145 is a three-claw shift fork 145. The profiled groove 1461 matched with the shift fork 145 is arranged in the coupling 146. By mounting the shift fork 145 in the profiled groove 1461, the coupling 146 may drive the shift fork 145 to rotate, and then drive the connecting rod 141 to rotate, so that the transmission effect of the brake device 1 is great.

Further, as shown in FIGS. 1 and 2, the braking assembly 14 further includes a first sleeve 147, and the first sleeve 147 is fitted over the connecting rod 141 and fixed with the connecting rod 141. An inner wall of the first sleeve 147 is fitted with the connecting rod 141, and an outer wall of the first sleeve 147 is fitted with the front pawl 142, so that the connection effect between the front pawl 142 and the connecting rod 141 can be great.

In some embodiments, as shown in FIGS. 1 and 2, the braking assembly 14 further includes a second sleeve 148, and the second sleeve 148 is fitted over the connecting rod 141 and fixed with the connecting rod 141. An inner wall of the second sleeve 148 is fitted with the connecting rod 141, one portion of an outer wall of the second sleeve 148 is fitted with an inner wall of the front pawl 142, and the other portion of the outer wall of the second sleeve 148 is fitted with an inner wall of the rear pawl 143, so that the connection effect between the front pawl 142 and the connecting rod 141 and the connection effect between the rear pawl 143 and the connecting rod 141 can be great.

In some embodiments, as shown in FIGS. 1 and 2, two torsion springs 12 are provided, and the two torsion springs 12 are coaxially fitted over the front pawl 142 and the rear pawl 143. In the brake device 1 according to the embodiments of the present disclosure, the two torsion springs 12 are arranged, so that the brake device 1 can have a great brake effect and a high reliability.

In some embodiments, as shown in FIGS. 1 and 2, the brake device 1 further includes an elastic ring 13, and the elastic ring 13 is fitted over the brake sleeve 11 and is configured to abut with the rope drum 2. In the brake device 1 according to the embodiments of the present disclosure, the elastic ring 13 is fitted over the brake sleeve 11 and an outer periphery of the elastic ring 13 abuts with the rope drum 2, so that a gap between the brake sleeve 11 and the rope drum 2 may be adjusted through the elastic ring 13, and hence the brake sleeve 11 and the rope drum 2 may float relative to each other within a certain range, thus reducing the noise caused by the friction between the brake sleeve 11 and the torsion spring 12 and reducing the equipment vibration caused by machining errors. In addition, the brake device 1 according to the embodiments of the present disclosure can reduce the running load, reduce the running current, reduce the energy consumption, and have a great use effect.

It can be understood that, as shown in FIGS. 1 and 2, one or more elastic rings 13 may be provided. For example, in the embodiments of the present disclosure, two elastic rings 13 are provided, and the two elastic rings 13 are spaced apart from each other along the axial direction of the brake sleeve 11. In the brake device 1 according to the embodiments of the present disclosure, the two elastic rings 13 are provided, so that the rotation of the brake sleeve 11 and the rope drum 2 is smooth, which is conducive to further reducing the generation of noise. For example, the elastic ring 13 may be an O-shaped rubber ring, thus reducing the production cost, simplifying the structure and facilitating the manufacturing and assembling.

Specifically, as shown in FIGS. 1 and 3, the brake sleeve 11 has a first mounting portion 111 where the brake sleeve 11 is configured to be fixed with the rope drum 2, and the two elastic rings 13 are arranged on both sides of the first mounting portion 111, respectively. For example, the rope drum 2 has a second mounting portion 21, and a threaded member may pass through the second mounting portion 21 and screwed into the first mounting portion 111, so as to fix the brake sleeve 11 with the rope drum 2 relative to each other. In this case, the second mounting portion 21 may include a through hole, and the first mounting portion 111 may include a threaded hole. Further, the through hole of the second mounting portion 21 may have threads or not, and the threaded hole of the first mounting portion 111 may be a blind hole or a through hole. The two elastic rings 13 are arranged on both sides of the first mounting portion 111, respectively, so that the brake sleeve 11 and the rope drum 2 may be buffered by the elastic rings 13 on both sides when they float relative to each other, and hence the brake sleeve 11 and the rope drum 2 may rotate more smoothly, which is conducive to further reducing the generation of noise.

In some embodiments, as shown in FIGS. 1 and 2, an annular groove 112 is formed in an outer peripheral wall of the brake sleeve 11, the elastic ring 13 is fitted in the annular groove 112, and an outer diameter of the elastic ring 13 is greater than a depth of the annular groove 112. It can be understood that the elastic ring 13 may be clamped in the annular groove 112, so as to prevent the elastic ring 13 from moving along the axial direction of the brake sleeve 11, thus improving the connection reliability of the elastic ring 13. Moreover, the outer diameter of the elastic ring 13 is greater than the depth of the annular groove 112, so that a certain gap for floating may be defined between the outer peripheral wall of the brake sleeve 11 and an inner wall of the rope drum 2, thus reducing the equipment vibration caused by manufacturing errors.

Further, as shown in FIG. 3, the brake device 1 also includes a speed reducer 17, and an end of the connecting rod 141 facing away from the drive motor 16 is connected to the speed reducer 17, so that the speed control effect of the brake device 1 can be great.

As shown in FIG. 3, the winch according to another embodiment of the present disclosure includes the rope drum 2 and the brake device 1, the rope drum 2 is configured to wind a traction rope on its outer periphery, the brake device 1 is the brake device 1 according to the embodiments of the present disclosure, and the brake sleeve 11 is arranged in the rope drum 2. For example, the drive motor 16 is arranged at one end of the rope drum 2, the speed reducer 17 is arranged at the other end of the rope drum 2, and the connecting rod 141 is located in the rope drum 2 and connected to the drive motor 16 and the speed reducer 17, respectively.

In the winch according to the embodiments of the present disclosure, the sealing member 15 is arranged between the brake sleeve 11 and the braking assembly 14, and the sealing cavity 113 is defined between the brake sleeve 11 and the braking assembly 14, so that the lubricating grease between the brake sleeve 11 and the torsion spring 12 can be prevented from being thrown out of the sealing cavity 113, and hence the lubrication of the lubricating grease between the brake sleeve 11 and the torsion spring 12 can be maintained for a long time, thus reducing the generation of noise, and achieving a great sealing effect of the brake device 1.

In the description of the present disclosure, it shall be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial" and "circumferential" should be construed to refer to the orientation and position as then described or as shown in the drawings under discussion. These relative terms are only for convenience of description and do not indicate or imply that the device or element referred to must have a particular orientation, or be constructed and operated in a particular orientation. Thus, these terms shall not be construed as limitation on the present disclosure.

In addition, terms "first" and "second" are only used for descriptive purposes and cannot be understood as indicating or implying relative importance or implicitly indicating the number of indicated technical features. Thus, the features defined by "first" and "second" may include at least one of the features explicitly or implicitly. In the description of the present disclosure, "a plurality of" means at least two such as two or three, unless otherwise expressly and specifically defined.

In the present disclosure, unless otherwise expressly defined, terms such as "mounting," "interconnection," "connection," "fixing" shall be understood broadly, and may be, for example, fixed connections, detachable connections, or integral connections; may also be mechanical or electrical connections or intercommunication; may also be direct connections or indirect connections via intervening media; may also be inner communications or interactions of two elements. For those skilled in the art, the specific meaning of the above terms in the present disclosure can be understood according to the specific situations.

In the present disclosure, unless otherwise expressly defined and specified, a structure in which a first feature is "on" or "below" a second feature may include an embodiment in which the first feature is in direct contact with the second feature, or may further include an embodiment in which the first feature and the second feature are in indirect contact through intermediate media. Furthermore, a first feature "on," "above," or "on top of" a second feature may include an embodiment in which the first feature is right or obliquely "on," "above," or "on top of" the second feature, or just means that the first feature is at a height higher than that of the second feature, while a first feature "below," "under," or "on bottom of" a second feature may include an embodiment in which the first feature is right or obliquely "below," "under," or "on bottom of" the second feature, or just means that the first feature is at a height lower than that of the second feature.

In the description of the present disclosure, terms such as "an embodiment," "some embodiments," "an example," "a specific example," or "some examples," means that a particular feature, structure, material, or characteristic described in connection with the embodiment or example is included in at least one embodiment or example of the present disclosure. Thus, the appearances of these terms in various places throughout this specification are not necessarily referring to the same embodiment or example of the present disclosure. Furthermore, the particular features, structures, materials, or characteristics may be combined in any suitable manner in one or more embodiments or examples. In addition, without contradiction, those skilled in the art may combine and unite different embodiments or examples or features of the different embodiments or examples described in this specification.

Although the embodiments of the present disclosure have been shown and described above, it can be understood that the above embodiments are exemplary and shall not be understood as limitation to the present disclosure, and changes, modifications, alternatives and variations can be made in the above embodiments within the scope of the present disclosure by those skilled in the art.

What is claimed is:

1. A brake device for a winch, the brake device comprising:

a brake sleeve, a torsion spring, a sealing member and a braking assembly, the torsion spring being fitted over the braking assembly, the brake sleeve being fitted over the torsion spring, the braking assembly being configured to drive the torsion spring to move between an expanded position and a retracted position, so as to lock and release the brake sleeve, and the sealing member being arranged between the brake sleeve and the braking assembly, so that a sealing cavity is defined between the brake sleeve and the braking assembly, wherein the sealing member comprises a first sealing sleeve and a second sealing sleeve, the first sealing sleeve and the second sealing sleeve are fitted over the braking assembly, and an outer peripheral wall of the first sealing sleeve and an outer peripheral wall of the second sealing sleeve abut with an inner wall of the brake sleeve, and wherein the sealing member further comprises at least one of:

a first sealing ring fitted over the first sealing sleeve, wherein an inner wall of the first sealing ring abuts with the outer peripheral wall of the first sealing sleeve, and an outer wall of the first sealing ring abuts with the inner wall of the brake sleeve;

a second sealing ring fitted over the second sealing sleeve, wherein an inner wall of the second sealing ring abuts with the outer peripheral wall of the second sealing sleeve, and an outer wall of the second sealing ring abuts with the inner wall of the brake sleeve; and a third sealing ring fitted over the braking assembly, wherein an inner wall of the third sealing ring abuts with the braking assembly, and an outer wall of the third sealing ring abuts with an inner wall of the second sealing sleeve.

2. The brake device according to claim 1, wherein the braking assembly comprises a drive motor, a coupling, a connecting rod, a front pawl and a rear pawl, the drive motor is connected to the connecting rod through the coupling, the front pawl and the rear pawl are coaxially arranged on the connecting rod, the torsion spring is arranged around the front pawl and the rear pawl, the first sealing sleeve is arranged between the rear pawl and the brake sleeve, the second sealing sleeve is arranged between the coupling and the brake sleeve, and the drive motor is configured to drive the front pawl and the rear pawl to rotate through the connecting rod, so that the torsion spring moves between the expanded position and the retracted position.

3. The brake device according to claim 2, wherein the braking assembly further comprises a shift fork fitted over the connecting rod, a profiled groove is arranged in one end of the coupling, the shift fork is mounted in the profiled groove, another end of the coupling is connected to the drive motor, and the drive motor is configured to drive the coupling to rotate, so that the shift fork drives the connecting rod to rotate.

4. The brake device according to claim 1, further comprising an elastic ring fitted over the brake sleeve and configured to abut with a rope drum of the winch.

5. The brake device according to claim 4, wherein two elastic rings are provided, and the two elastic rings are spaced apart from each other along an axial direction of the brake sleeve.

6. The brake device according to claim 5, wherein the brake sleeve has a first mounting portion where the brake sleeve is configured to be fixed with the rope drum, and the two elastic rings are arranged on both sides of the first mounting portion, respectively.

7. The brake device according to claim 4, wherein an annular groove is defined in an outer peripheral wall of the brake sleeve, the elastic ring is fitted in the annular groove, and an outer diameter of the elastic ring is greater than a depth of the annular groove.

8. A winch comprising:

a rope drum configured to wind a traction rope on an outer periphery of the rope drum;

a brake device arranged in the rope drum, the brake device comprising a brake sleeve, a torsion spring, a sealing member and a braking assembly, the torsion spring being fitted over the braking assembly, the brake sleeve being fitted over the torsion spring, the braking assembly being configured to drive the torsion spring to move between an expanded position and a retracted position, so as to lock and release the brake sleeve, and the sealing member being arranged between the brake sleeve and the braking assembly, so that a sealing cavity is defined between the brake sleeve and the braking assembly, wherein the winch further comprises an elastic ring fitted over the brake sleeve and configured to abut with the rope drum, wherein two elastic rings are provided, and the two elastic rings are spaced apart from each other along an axial direction of the brake sleeve, wherein the brake sleeve has a first mounting portion where the brake sleeve is configured to be fixed with the rope drum, and the two elastic rings are arranged on both sides of the first mounting portion, respectively.

9. The winch according to claim 8, wherein the sealing member comprises a first sealing sleeve and a second sealing sleeve, the first sealing sleeve and the second sealing sleeve are fitted over the braking assembly, and an outer peripheral wall of the first sealing sleeve and an outer peripheral wall of the second sealing sleeve abut with an inner wall of the brake sleeve.

10. The winch according to claim 9, wherein the sealing member further comprises:

a first sealing ring fitted over the first sealing sleeve, an inner wall of the first sealing ring abuts with the outer peripheral wall of the first sealing sleeve, and an outer wall of the first sealing ring abuts with the inner wall of the brake sleeve;

a second sealing ring fitted over the second sealing sleeve, an inner wall of the second sealing ring abuts with the outer peripheral wall of the second sealing sleeve, and an outer wall of the second sealing ring abuts with the inner wall of the brake sleeve; and a third sealing ring fitted over the braking assembly, an inner wall of the third sealing ring abuts with the braking assembly, and an outer wall of the third sealing ring abuts with an inner wall of the second sealing sleeve.

11. The winch according to claim 9, wherein the braking assembly comprises a drive motor, a coupling, a connecting rod, a front pawl and a rear pawl, the drive motor is connected to the connecting rod through the coupling, the front pawl and the rear pawl are coaxially arranged on the connecting rod, the torsion spring is arranged around the front pawl and the rear pawl, the first sealing sleeve is arranged between the rear pawl and the brake sleeve, the second sealing sleeve is arranged between the coupling and the brake sleeve, and the drive motor is configured to drive the front pawl and the rear pawl to rotate through the connecting rod, so that the torsion spring moves between the expanded position and the retracted position.

12. The winch according to claim 11, wherein the braking assembly further comprises a shift fork fitted over the connecting rod, a profiled groove is arranged in one end of the coupling, the shift fork is mounted in the profiled groove, another end of the coupling is connected to the drive motor, and the drive motor is configured to drive the coupling to rotate, so that the shift fork drives the connecting rod to rotate.

13. The winch according to claim 8, wherein an annular groove is defined in an outer peripheral wall of the brake sleeve, the elastic ring is fitted in the annular groove, and an outer diameter of the elastic ring is greater than a depth of the annular groove.

14. A brake device comprising:

a brake sleeve, a torsion spring, a sealing member and a braking assembly, the torsion spring being fitted over the braking assembly, the brake sleeve being fitted over the torsion spring, the braking assembly being configured to drive the torsion spring to move between an expanded position and a retracted position, so as to lock and release the brake sleeve, and the sealing member being arranged between the brake sleeve and the braking assembly, so that a sealing cavity is defined between the brake sleeve and the braking assembly, wherein the sealing member comprises a first sealing sleeve and a second sealing sleeve, the first sealing sleeve and the second sealing sleeve are fitted over the braking assembly, and an outer peripheral wall of the first sealing sleeve and an outer peripheral wall of the second sealing sleeve abut with an inner wall of the brake sleeve, wherein the braking assembly comprises a drive motor, a coupling, a connecting rod, a front pawl and a rear pawl, the drive motor is connected to the connecting rod through the coupling, the front pawl and the rear pawl are coaxially arranged on the connecting rod, the torsion spring is arranged around the front pawl and the rear pawl, the first sealing sleeve is arranged between the rear pawl and the brake sleeve, the second sealing sleeve is arranged between the coupling and the brake sleeve, and the drive motor is configured to drive the front pawl and the rear pawl to rotate through the connecting rod, so that the torsion spring moves between the expanded position and the retracted position, and wherein the braking assembly further comprises a shift fork fitted over the connecting rod, a profiled groove is arranged in one end of the coupling, the shift fork is mounted in the profiled groove, another end of the coupling is connected to the drive motor, and the drive motor is configured to drive the coupling to rotate, so that the shift fork drives the connecting rod to rotate.

* * * * *